Patented June 22, 1948

2,443,998

UNITED STATES PATENT OFFICE 2,443,998

HARDENING TYPE GASKET CEMENT CONTAINING POLYVINYL BUTYRAL AND POLYVINYL ACETATE

Chester M. White, Rochester, N. Y., assignor to Genesee Research Corporation, Rochester, N. Y., a corporation of New York No Drawing. Application December 23, 1944, Serial No. 569,627

4 Claims. (Cl. 260—29.8)

The present invention relates to new and improved adhesive compositions, and is more particularly concerned with pasty, cementitious compositions having enhanced adhesive tenacity, especially to metal surfaces, and capable of producing films which are flexible, durable and inordinately resistant to water and many organic solvents both at low and moderately elevated temperatures.

While not strictly limited thereto, the improved cements or adhesives of the present invention have use in fields of automotive use, such as hardening type gasket cements.

Generally speaking, hardening type gasket cements of the prior art have usually been made from natural resins dissolved in a low boiling aliphatic alcohol such as ethyl alcohol. To this solution have been added various plasticizers and fillers to give the finished composition semi-solidity and plasticity. In use, after the cement has been applied to a surface, the volatile component, ethyl alcohol, was allowed to evaporate and there was left a hard but somewhat flexible film. This film is relatively impervious to the action of aqueous alcohol solutions, aqueous glycol solutions, gasoline, mineral oil, and water, at temperatures of 160–190° F.

It is the purpose and one of the prime objects of this invention to provide hardening type gasket cements of the foregoing general character but which have improved resistance to water and various solvents when reduced to a dried film. Another objective is to provide hardening type cements which, after application to a surface such as a metal surface, set up as flexible and durable films. A still further object or purpose is to produce compositions of this nature which are stable with respect to separation of the components thereof even upon long standing.

It has been found that improved hardening gasket cements are produced when a blend of two certain specific vinyl resins is used, in specific proportions one to the other, in solution in a particular solvent.

Of the vinyl resins, polyvinyl butyral resin possesses excellent resistance to aqueous alcohol and other solutions but the dried film does not possess a satisfactory degree of flexibility. Polyvinyl acetate films, on the other hand, have excellent flexibility but tend to soften in alcoholic solutions. It has been found that a combination of the two resins, when dissolved in a particular solvent therefor and in predetermined proportions, produces a dried film which shows good resistance to aqueous alcoholic solutions and which also possesses excellent flexibility.

Ordinarily, blends of polyvinyl butyral and polyvinyl acetate are comparatively incompatible, that is, a mixture of the two resins when dissolved in conventional solvents such as alcohol or acetone show separation into phases on standing or on being centrifuged. It has been discovered that Cellosolve (monoethyl ether of ethylene glycol) will render the blend of polyvinyl butyral and polyvinyl acetate resins compatible and homogeneous in the liquid state, provided, as pointed out hereinafter, a critical ratio of one resin to the other is maintained. A particular blend of the two resins, in other words, when dissolved in Cellosolve shows no separation into phases on standing or on being centrifuged for two hours at 1500 R. P. M. Furthermore, the finished composition with plasticizer, drying solvent and filler, shows no separation of the liquid ingredients after standing several weeks in metal tubes.

The ratio of resins in the composition must be maintained at approximately two parts of polyvinyl butyral to one part polyvinyl acetate. The ratio must not be allowed to depart much from these figures since other ratios of polyvinyl butyral to polyvinyl acetate show separation on standing. For example, a ratio of three parts of polyvinyl butyral to one part of polyvinyl acetate showed separation after a few days.

Exemplary of the finished composition is the following formula:

| | Percent |
|---|---|
| Polyvinyl butyral resin | 9.0 |
| Polyvinyl acetate resin | 4.5 |
| Cellosolve | 35.0 |
| Terposol #8 (terpinyl ethylene glycol ether) | 1.5 |
| Ethyl alcohol | 10.0 |
| Asbestine pulp (natural fibrous magnesium silicate) | 40.0 |

In this composition the ethyl alcohol is not, strictly speaking, a solvent, but is added for the purpose of shortening the time required for surface drying of the product when it is exposed to air. It will be understood that other low boiling organic liquids such as methyl or propyl alcohol or acetone, or appropriate mixtures thereof, may be substituted for the ethyl alcohol.

Terposol #8 (terpinyl ethylene glycol ether) serves very definitely to improve adhesion to metallic surfaces, and also improves flexibility of the dried film. The use of this particular plasticizer or softening agent is especially adaptable to vinyl resin blends of the foregoing character when in solution in Cellosolve.

The asbestine pulp is, of course, merely a filler, and other inorganic compounds such as talc, kaolin, calcium carbonate, magnesia and kieselguhr may be substituted for the asbestine.

In compounding the preceding composition, one hundred pounds of Cellosolve is first placed in a Sigma type agitator and then with the machine operating slowly a portion of the powdered polyvinyl butyral resin is added until the mixture becomes pasty in appearance. Then there is added more Cellosolve up to one hundred pounds as well as the balance of the powdered polyvinyl butyral resin. If the mixture is not too heavy, powdered polyvinyl acetate resin interspersed with Cellosolve is added slowly to keep the mixture a light paste form thus preventing lumping. After mixing for a half-hour the balance of the Cellosolve is added. While maintaining the mixture at 40° C. mixing is continued for an additional two hours until it becomes smooth. The alcohol and Terposol #8 are then added and the mixture stirred until completely mixed. As a final step the asbestine is added slowly and after approximately one hour of mixing the compound is finished.

I claim:

1. An improved cement having as its adhesive base a blend of polyvinyl butyral resin and polyvinyl acetate resin dissolved in monoethyl ether of ethylene glycol to give a stable solution, the weight ratio of polyvinyl butyral resin to polyvinyl acetate resin being approximately 2 to 1.

2. An improved cement having an adhesive base comprising terpinyl ethylene glycol ether and a blend of polyvinyl butyral resin and polyvinyl acetate resin dissolved in monoethyl ether of ethylene glycol to give a stable solution, the weight ratio of polyvinyl butyral resin to polyvinyl acetate resin being approximately 2 to 1.

3. An improved cement having an adhesive base comprising approximately 1.5 parts by weight terpinyl ethylene glycol ether and a blend of approximately 9 parts polyvinyl butyral resin and 4.5 parts by weight polyvinyl acetate resin dissolved in approximately 35 parts by weight of monoethyl ether of ethylene glycol to give a stable solution.

4. An improved hardening gasket cement having approximately the following formula, the indicated percentages being on a weight basis:

| | Per cent |
|---|---|
| Polyvinyl butyral resin | 9.0 |
| Polyvinyl acetate resin | 4.5 |
| Monoethylether of ethylene glycol | 35.0 |
| Terpinyl ethylene glycol ether | 1.5 |
| Ethyl alcohol | 10.0 |
| Asbestine pulp (natural fibrous magnesium silicate) | 40.0 |

CHESTER M. WHITE.

REFERENCES CITED

The following references are of record in the file of this patent:

UNITED STATES PATENTS

| Number | Name | Date |
|---|---|---|
| 2,136,011 | Humphrey | Nov. 8, 1938 |
| 2,224,663 | Berg et al. | Dec. 10, 1940 |
| 2,372,074 | Ford | Mar. 20, 1945 |